United States Patent
Banister

(10) Patent No.: US 6,636,552 B1
(45) Date of Patent: *Oct. 21, 2003

(54) SEQUENCE HOPPING FOR COMBINATIONS OF PSEUDO-RANDOM NOISE SEQUENCES

(75) Inventor: Brian C. Banister, San Diego, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/440,770

(22) Filed: Nov. 16, 1999

Related U.S. Application Data

(63) Continuation-in-part of application No. 08/969,219, filed on Nov. 13, 1997, now Pat. No. 5,987,056.

(51) Int. Cl.$^7$ ................................................. H04B 1/69
(52) U.S. Cl. ...................................... 375/130; 375/138
(58) Field of Search ................................ 375/130, 138, 375/132, 134, 135; 370/311, 335

(56) References Cited

U.S. PATENT DOCUMENTS

| | | | |
|---|---|---|---|
| 5,291,475 A | 3/1994 | Bruckert | 370/95.1 |
| 5,793,795 A | 8/1998 | Li | 375/200 |
| 5,910,944 A | 6/1999 | Callicotte et al. | 370/311 |
| 5,987,056 A * | 11/1999 | Banister | 375/130 |
| 6,236,352 B1 * | 5/2001 | Walmsley | 342/118 |

* cited by examiner

Primary Examiner—Khai Tran
(74) Attorney, Agent, or Firm—Mitchell Silberberg & Knupp LLP

(57) ABSTRACT

Provided is a method and an apparatus for pseudo-random noise (PN) code sequence hopping, in which an output PN code sequence is generated by generating and combining several intermediate PN code sequences, each of the intermediate PN code sequences being generated by a corresponding PN code sequence generator. A base state is stored for each of the plural intermediate PN code sequences, and the number of states to advance the output PN code sequence is identified, the number being greater than one. A transformation function is obtained for each of the plural intermediate PN code sequences, based on the number of states to advance the output PN code sequence, and then the base state for each intermediate PN code sequence is advanced by the number of states to advance the output PN code sequence, by utilizing the transformation function for such intermediate PN code sequence, to obtain a new state for such intermediate PN code sequence. The new state for each intermediate PN code sequence is then loaded into the corresponding PN code sequence generator, and the PN code sequence generators are enabled with the new states.

25 Claims, 4 Drawing Sheets

SEQUENCE HOPPING FOR COMBINATIONS OF PSEUDO-RANDOM NOISE SEQUENCES

This application is a continuation-in-part of U.S. patent application No. 08/969,219, "PN Sequence Hopping Method and System", filed Nov. 13, 1997 now U.S. Pat. No. 5,987,056, which application is incorporated herein by reference as though set forth herein in full.

BACKGROUND OF THE INVENTION

FIELD OF THE INVENTION

The present invention relates to the field of spread spectrum wireless communications and to any other field that uses Pseudo-random Noise (PN) sequences, such as maximal length code sequences generated using a Linear Feedback Shift Register (LFSR), truncated maximal length code sequences or Gold code sequences.

Description of the Related Art

Many spread spectrum and other communications systems utilize pseudo-random noise (PN) code sequences for scrambling communications, permitting separation of various transmitting stations, and other purposes. Generally speaking, a PN code sequence exhibits certain random-like properties, even though the code actually is generated in a deterministic manner. Most of the PN code sequences in common use are cyclically repeating sequences of digital 1's and 0's generated using one or more Linear Feedback Shift Registers (LFSRs), such as the maximal length code sequences described below in Section I of the Description of Preferred Embodiments, the truncated maximal length code sequences described below in Section II of the Description of Preferred Embodiments, and the Gold code sequences described below in Section III of the Description of Preferred Embodiments.

If a device is encoding its transmissions using a PN code sequence, then in order to decode those transmissions, the receiving device requires both the code itself and the proper synchronization with the transmitting device. As a result, once a communications channel is opened between two devices (and, therefore, synchronization has been established), it conventionally has been necessary for each device to continuously generate the PN code sequence, so as to maintain synchronization. It should be noted that such generators often require a high speed clock, such as one that operates at 1.2288 megahertz (MHz). Frequently, such clocks require relatively large power consumption. While this may not be a significant problem for a base station, it can be very significant for a mobile station that operates on battery power.

Some communications devices allow for "sleep" periods, during which the PN sequence and other hardware necessary for transmitting or receiving signals may not be needed. An example is a Direct Sequence Spread Spectrum (DSSS) cellular system using long duration, rapidly switching (between 1's and 0's) PN sequences. Such cellular systems generally include provision for a sleep mode during which it is not necessary for the Mobile Station (MS), such as a hand held cellular phone, to receive the transmission from the Base Station (BS). In this way, portions of the mobile unit can be powered down during the sleep period and the average power drain can be decreased, thereby increasing the standby time of the battery powered unit.

At the end of a sleep period in a DSSS system, it is necessary for the MS to have a local version of the PN code sequence that is synchronized to that of the BS. Prior art designs continue to utilize a high speed clock for the purpose of maintaining the synchronization of the PN sequence during sleep. Thus, conventionally, the PN code sequence generator must remain enabled in order to maintain the PN sequence code synchronization. Since the prior art requires the maintenance of a high speed clock, the average power drain of the unit is higher than it would be if this clock source could be turned off.

SUMMARY OF THE INVENTION

The present invention addresses the foregoing concerns by advancing, or hopping, a PN code sequence by a number of states and then enabling the PN code sequence generator with the hopped state.

Thus, in one aspect, the present invention is directed to pseudo-random noise (PN) code sequence hopping by storing a base state of a PN code sequence generator that generates a PN code sequence and by identifying a number of states to advance the PN code sequence, the number being greater than one. A transformation function is obtained based on the number of states to advance the PN code sequence and then the PN code sequence is advanced by the identified number of states from the base state to obtain a new state, by utilizing the transformation function. Finally, the new state is loaded into the PN code sequence generator and the PN code sequence generator is enabled with the new state.

By advancing the state of the PN code sequence generator in the foregoing manner, the present invention can permit the generator (or at least the clock driving the generator) to be turned off for periods of time, thus frequently resulting in power savings. Alternatively, using this hopping technique, the PN code sequence generator can be used for generating other PN code sequences (such as for monitoring other base stations) when it is not necessary to monitor the current base station; then, when it is again necessary to monitor the current base station, the generator can be loaded with the appropriately hopped state and enabled with that state.

In a preferred embodiment of the present invention, the step of advancing the PN code sequence comprises multiplying the base state by an appropriate factor, such as a Galois Field (GF) polynomial or a matrix. In the former case, a serial Galois Field multiplier preferably is used to perform this multiplication, the serial Galois Field multiplier preferably including a linear feedback shift register which utilizes insertion architecture.

The techniques of the present invention can be applied, for example, either to a maximal length PN code sequence or to a truncated maximal length PN code sequence. The main difference between these two cases is the identification of the transformation function required to advance the state. Although the same types of transformation functions generally may be used for both cases, the parameters of those functions may be different based on whether or not truncation is being utilized. For example, in both cases the hop can be performed by multiplying the state by a GF polynomial raised to an exponent that is based on the number of state transitions. For non-truncated sequences, the exponent generally is the same as the number of state transitions, while for truncated sequences a modulo function may be performed or an additional factor introduced to account for the truncation.

In a further aspect, the invention is directed to pseudo-random noise (PN) code sequence hopping, in which an output PN code sequence is generated by generating and combining several intermediate PN code sequences, each of the intermediate PN code sequences being generated by a corresponding PN code sequence generator. A base state is stored for each of the plural intermediate PN code sequences, and the number of states to advance the output PN code sequence is identified, the number being greater than one. A transformation function is obtained for each of the plural intermediate PN code sequences, based on the number of states to advance the output PN code sequence, and then the base state for each intermediate PN code sequence is advanced by the number of states to advance the output PN code sequence, by utilizing the transformation function for such intermediate PN code sequence, to obtain a new state for such intermediate PN code sequence. The new state for each intermediate PN code sequence is then loaded into the corresponding PN code sequence generator, and the PN code sequence generators are enabled with the new states.

In the foregoing manner, a PN code sequence that is generated from several other PN code sequences can be hopped to a new state, thereby permitting the combined PN code sequence generator either to be shut down for a period of time (typically resulting in power savings) or to be used for other purposes. In either case, greater efficiency often can be achieved. The foregoing technique generally can be applied, for example, regardless of whether the various intermediate PN code sequences are truncated or non-truncated maximal length sequences.

The following comments briefly summarize how the present invention operates in a representative embodiment. At the end of a sleep period in a DSSS system, it is necessary for the MS to have a local version of the PN code sequence that is synchronized to that of the BS. Note that the PN code sequence is assumed to be synchronized prior to the sleep period—thus, the information exists to bring up the PN code sequence at the appropriate state at the end of the sleep period. The present invention uses the state of the PN code sequence generator prior to the sleep period to calculate the appropriate generator state at a desired time after the end of the sleep period. In this way, the high speed clock that runs the PN generator LFSR can be turned off. A low speed clock, typically a 32 kHz oscillator, is maintained and controls a counter to let the system know when to turn back on. The low speed clock consumes less power than the high speed clock, and thus there is a net power savings.

A simple analogy is to a clock or watch. If one has an external timer and does not need the watch output for some period of time, one could set the timer to N hours, set the watch N hours ahead and turn the watch off. When the timer expires, the watch may be turned on and will display the correct time thereafter. In the present invention, the PN code sequence generator LFSR is analogous to the watch. The low speed clock is analogous to the timer. Setting the watch is analogous to performing the PN code sequence hop, which hops the LFSR state over all the intermediate states and directly from the state prior to the sleep period to the state after the sleep period.

The foregoing summary is intended merely to provide a quick understanding of the general nature of the present invention. A more complete understanding of the invention can only be obtained by reference to the following detailed description of the preferred embodiments in connection with the accompanying drawings.

DESCRIPTION OF THE PREFERRED EMBODIMENTS

I. Maximal Length Sequences

A. Terminology

The terminology of this description refers to a "slotted" mode for paging channel monitoring in a DSSS cellular system. The "slot" is the period of time during which the mobile must monitor the paging channel. During any other period of time the mobile does not need to monitor the paging channel. This non-monitoring time is then used for calculations and sleep (i.e., shut down of non-essential components). A low speed clock used in the power saving sleep mode will generally be referred to as a 32 kHz oscillator, although in principle any oscillator could be used. To attain any benefit, the oscillator used should result in lower power drain than retaining the PN sequence generator's normal fast clock. However, it is noted that merely shutting down the PN code sequence generator for some period of time may result in power savings or other advantages. In addition, the present invention may permit the PN code sequence generator to be used to generate other PN code sequences during times when the main PN code sequence is not needed.

B. Sequence of Events

Figure 3:
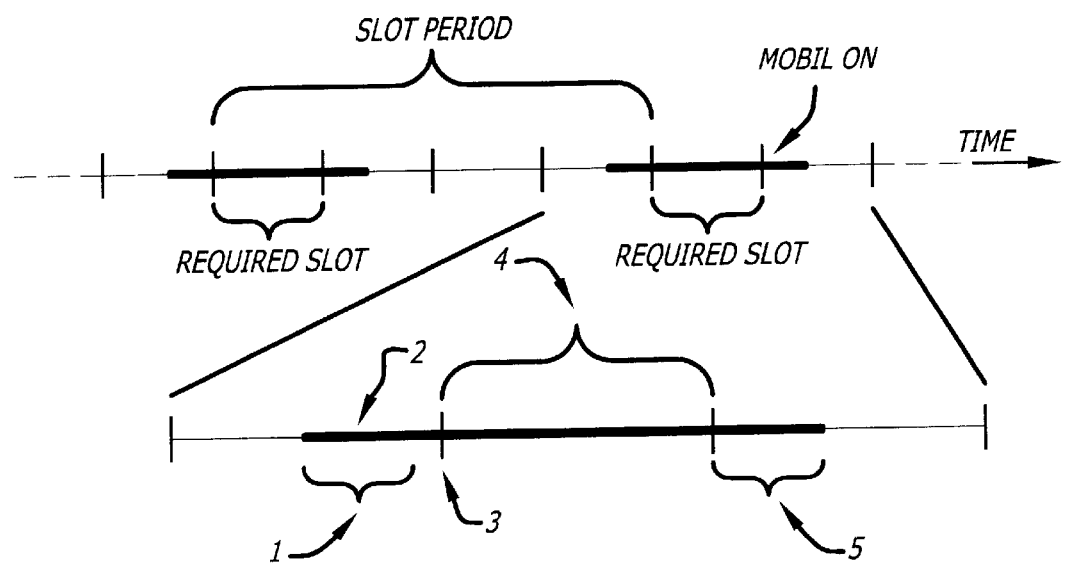
FIG. 3 is a time line of slotted mode activity.

A representative sequence of events performed for PN sequence hopping is shown on the time line of FIG. 3, which shows that the paging channel is monitored for one slot. Note that there is some period of time during which the mobile is on and not yet monitoring the slot; the mobile needs some time in order to reacquire some timing information and perform computations. The actions shown in FIG. 3 are more fully described below in which the following steps are performed during the time periods labeled on FIG. 3 with the same numbers.

Step 1. Power up, reacquire timing and PN sequence hop: full system power up including the high speed clock, the radio (receive portion) and peripherals. There is some radio settling time before any reacquisition processing starts. Typically, there will be a shorter PN sequence, not hopped, which is transmitted by the Base Station (BS) and allows the Mobile Station (MS) to reacquire timing. This timing is reacquired by searching a window of possible timings, the size of which is determined as a function of the off time, low speed clock stability and calibration accuracy. PN sequence hop processing is performed during this time; a new PN sequence generator state is calculated and the PN sequence generator state is hopped to the beginning of the required slot. The PN sequence generator remains disabled during this step.

Step 2. The new PN sequence generator state is loaded into the PN sequence generator, which is still disabled.

Step 3. The PN sequence generator is enabled (starts running): the state previously written into the generator corresponds to this point of time, so the generator is now started. By adjusting the timing when the PN sequence generator is enabled, discrepancies in timing between the MS and the BS can be compensated. The PN sequence generator writes its state into a register such that it may be used for the next hop. Note that in steady state this is not necessary, as the value has just been written and is already known. However, this function is needed to give the sequence generator state necessary for the very first hop performed.

Step 4. Monitoring slot: the PN sequence state is properly aligned and the MS can successfully receive the required slot. If this is the first "slot" and no hops have yet been performed, then the sequence state written in Step 3 above must be read for use in the first hop; otherwise, the previously written result can be used.

Step 5. Shutdown decision, power down: the mobile goes through power down procedures, which include setting the low speed clock (32 kHz) counter with the sleep time.

It is noted that PN sequence hop processing can be performed just after power up or just prior to power down. A preferred realization performs the processing just after power up rather than just before power down because this allows the processing to be done while other events are already going on (radio setup and timing reacquisition, etc). Thus, the system does not need to be left powered up while only processing is occurring before the system is turned off.

C. PN Definition and Circuits

Binary pseudo-random noise sequences have a number of properties analogous to a wide sense stationary equally likely binary random process. These properties ensure that the resulting spectrum and correlation properties appear noise-like. The behavior of a pseudo-random noise generator is governed by its generator polynomial. In the preferred embodiment of the present invention, this takes the form of Equation 1 below:

$$G_I(D) = g_0 + g_1 D + g_2 D^2 + \ldots + g_N D^N \quad \text{Equation 1}$$

Here, D is the delay operator. The polynomial coefficients are mod-2 numbers (0 or 1). This polynomial defines a finite field, commonly called a Galois Field (GF) and termed GF($2^N$) because there are $2^N$ elements in the field. Note that both $g_0$ and $g_N$ will always be 1 for a maximal order-N sequence. The output equation is:

$$I[n] = g_1 I[n-1] \oplus g_2 I[n-2] \oplus g_3 I[n-3] \oplus \ldots \oplus g_N I[n-N] \quad \text{Equation 2}$$

Figure 1:
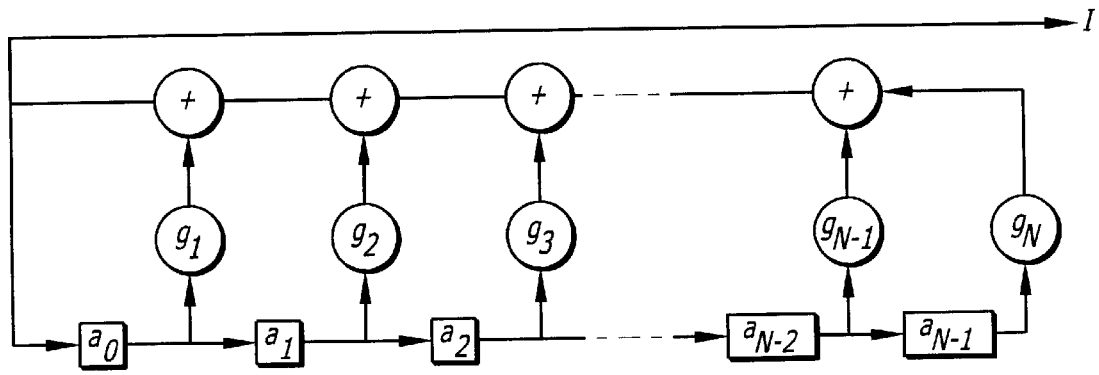
FIG. 1 is a block diagram of a prime architecture linear feedback shift register.
Figure 2:
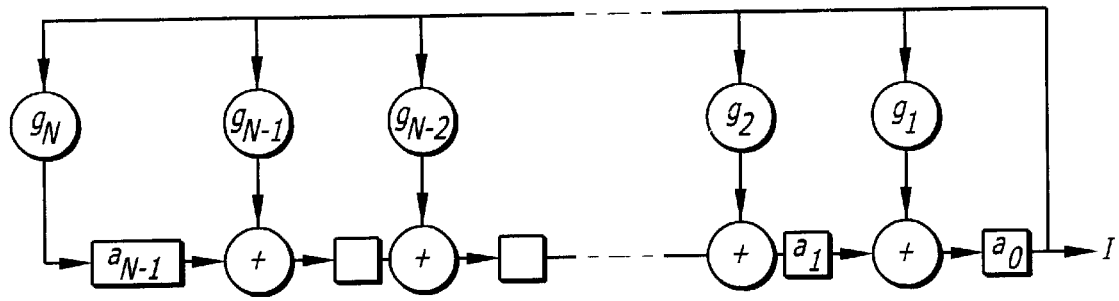
FIG. 2 is a block diagram of an insertion architecture linear feedback shift register.

The output of Equation 2 is obtained directly by the circuit of FIG. 1. This is referred to as the "prime architecture" as all feedback is to the first register. Another circuit to obtain the same output is shown in FIG. 2; this is referred to as "insertion architecture" as feedback is inserted midchain. The insertion architecture generator does not go through the same sequence of states, although the resultant output is the same. The insertion LFSR has the advantage of faster operation. Specifically, each XOR output is derived from only two inputs, minimizing gate delay. However, with the speed of modern circuits this is generally not a critical issue at the PN sequence rates typically used.

A PN sequence can be generated using either the insertion or prime architectures. Matrix representation can be used to define each state as a function of clock cycle. For insertion architecture:

$$G_I = \begin{bmatrix} g_1 & 1 & 0 & \cdots & 0 \\ g_2 & 0 & 1 & \cdots & 0 \\ g_3 & 0 & 0 & \cdots & 0 \\ \cdots & \cdots & \cdots & \cdots & \cdots \\ g_N & 0 & 0 & \cdots & 0 \end{bmatrix} =$$

PN generator matrix for the insertion architecture $$\bar{a}(n) = \begin{bmatrix} a_0 \\ a_1 \\ \cdots \\ a_{N-1} \end{bmatrix} = \text{state vector of LFSR, insertion architecture}$$

I(n)=PN output
Then:

$$\bar{a}(n+1) = G_I \cdot \bar{a}(n)$$

and more generally $$\bar{a}(n+M) = G_I^M \cdot \bar{a}(n)$$

The output I at any given time is $a_0$:

$$I(n) = \bar{a}(n)^T \cdot \bar{1}$$

where $$\bar{1}^T = [1\ 0\ \ldots\ 0]$$

Thus, $$IPN(n+M) = (G_I^M \cdot \bar{a}(n))^T \cdot \bar{1}$$

Similarly, for the prime architecture:

$$G_P = \begin{bmatrix} g_1 & g_2 & g_3 & \cdots & g_N \\ 1 & 0 & 0 & \cdots & 0 \\ 0 & 1 & 0 & \cdots & 0 \\ \cdots & \cdots & \cdots & \cdots & \cdots \\ 0 & 0 & 0 & \cdots & 0 \end{bmatrix} =$$

$G_I^T$ = PN generator matrix for the prime architecture and $$IPN(n+M) = (G_P^M \cdot \bar{a}(n))^T \cdot \bar{1}$$

D. PN Sequence Hopping Calculation

Figure 4:
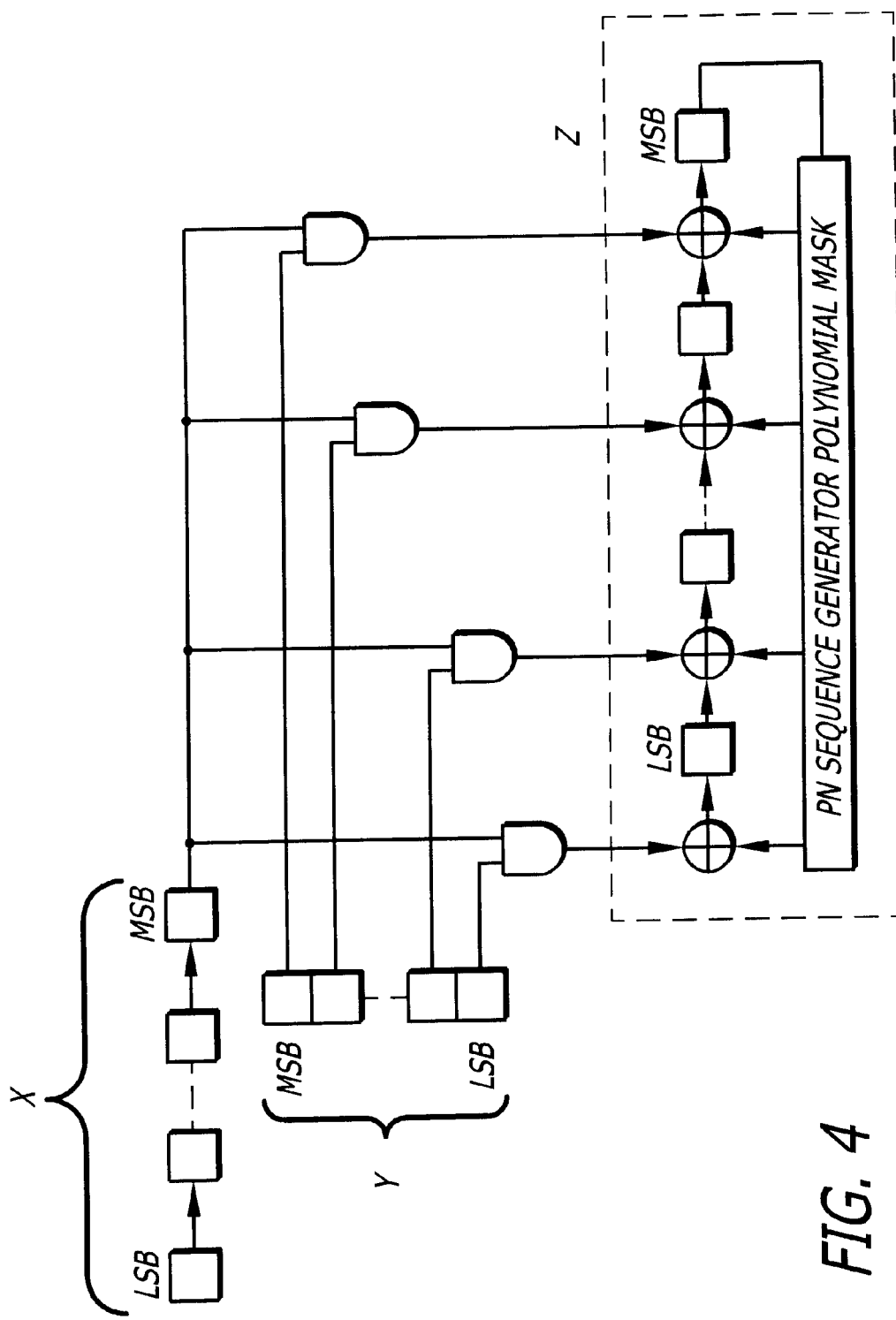
FIG. 4 is a diagram of a serial Galois Field Multiplier.

The PN sequence generators described above are each an example of a Linear Feedback Shift Register (LFSR). Such generators are commonly described mathematically in terms of Galois Fields (GF). The resultant state of an insertion LFSR, which is clocked some number of times from a base state, can be calculated using GF arithmetic by multiplication of the base state by some GF polynomial. The product is the resultant state. A realization of a serial GF multiplier is shown in FIG. 4.

The field is defined by the PN sequence generator polynomial, which is the feedback mask of the LFSR. The field of interest is denoted GF($2^N$), where there are N registers in the LFSR and the resultant PN sequence length is $2^N-1$ (the all zero state is excluded from a PN sequence generator). The multiplication gives Z=XY, where X, Y, Z are all elements of GF($2^N$). The X register is a standard shift register; the Y register is static; the Z register is a linear feedback shift register with additional insertion XOR inputs for the output of the X shift register masked by the Y register contents. The result is obtained by initializing the X and Y registers to the factors and the Z register to all zeros, and clocking the circuit N times. The Z register then contains the product. This operation can be accomplished fairly easily in software with bitwise manipulation, or may be implemented in hardware.

The distance of the sequence hop is the slot period, which is the time from the beginning of one slot to the beginning of the next slot. The reason for choosing the beginning of the slot prior to sleep as the hop base rather than a later time just prior to sleep is simply regularity. In practical applications, it is possible that the mobile will be required to perform certain other tasks after a slot, and thus the time at which the mobile shuts off may vary. By always using the beginning of the slot as the hop's base, the length of the hop never changes and thus the polynomial needed for the GF multiplication is constant.

Define the following variables:
- M1=number of "clock cycles" or state transitions equivalent to the sequence hop.
- Ts=slot period, in seconds. This is the hop distance in seconds.
- Tr=hop resolution, in seconds. If necessary, hops shorter than Ts can be made with this time resolution.
- F=the frequency of the PN sequence generator clock, in Hz Typically, for full slot period hops, M1 can be found as:
- M1=Ts*F Incrementing the insertion sequence generator by one clock cycle is the same as multiplying the state polynomial by x, where the state polynomial is denoted as a function of x. Thus, to get the PN sequence generator state that would have resulted from M1 clocks, multiply the base state polynomial by $x^{M1}$. In $GF(2^N)$, $x^{M1}$ is a polynomial with N coefficients, which can be precalculated and stored as an N bit vector, in a Read Only Memory (ROM) for example. It can be readily seen by observing the serial GF multiplier shown in FIG. 4 that x is a string of bits in which the second least significant bit is a 1 and all other bits are 0s. Thus, $x^M$ can be generated by using the serial GF multiplier in FIG. 4 and multiplying x by itself M times. Alternatively, x can be generated by using the insertion architecture generator of FIG. 2 by initially setting register $a_{N-1}$ to 1 and all other registers to 0s, and clocking the generator M times; upon completion of this operation, the registers $a_{N-1}$ to $a_0$ represent $x^M$ with $a_{N-1}$ being the least significant bit and $a_0$ being the most significant bit of $x^M$. As noted above, $x^M$ can be calculated in advance and then stored in advance for use in real time in the GF multiplier.

Under certain conditions, a hop that is shorter than a full slot period may be necessary. An example in cellular communications is when the mobile user initiates a call and the unit is in the middle of a very long sleep period. It is desirable that the sleep should terminate immediately such that the call may be placed. In this condition the mobile must compute the next time at which it can fully resume operations, as is determined by the amount of time transpired and the hop resolution Tr described above.

Define the following variables:
- K=the multiple of Tr which determines the length of the resultant shortened hop.
- M2=number of state transitions corresponding to the hop resolution
- M3=number of state transitions corresponding to shortened hop then:
- M2=Tr*F
- M3=K*M2=K*Tr*F Again, the generator state after the hop is given by multiplying the prior state by $x^{M3}=(x^{M2})^K$. Recall that $x^M$ for arbitrary M is a polynomial with N coefficients, as defined by Galois Field theory. Each coefficient is a single bit, and thus $x^M$ is simply processed and stored as a N bit vector. While these polynomials can be arduously calculated by the system, it is preferred to store a certain basis set of polynomials and use these to derive any additional polynomials as needed. This can be done by the simple and intuitive GF relationship:

$$x^{a-b}=x^a*x^b$$

where a and b are any arbitrary integers.

Thus, the following are stored:
- $H=x^{M1}$; the polynomial used for a regular slot period hop.
- $G_n=(x^{M2})^{2^n}$; series of polynomials for calculating arbitrary hops Note that in a real system there may be more than one possible slot period and thus more than one hop polynomial stored. The array of $G_n$ contains the polynomials that can be easily used to obtain an arbitrary hop distance, as illustrated below.

Define the following:
- $S_0$ the value of the base polynomial state of the sequence generator which is used for the hop—this is the value written at the beginning of the first slot or retained in memory for subsequent slots, corresponding to the first generator state of the slot.
- $S_1$ the polynomial state of the generator after the hop, which should be the first chip of the next slot. Per FIG. 3 this is loaded as step 2. and begins running at step 3. Note that this is the slot after the slot used to give $S_0$ above.

The calculation of the new generator state for a normal full slot period hop is simply done with GF multiplication, as is shown in FIG. 4:

$$S_1=S_0*H$$

In the event that the mobile must exit sleep early due to a user initiated call or some other event, the mobile must perform all tasks similar to the time line of FIG. 3, but the polynomials used for the multiplication will be different to reflect the shorter hop. As stated above, the mobile must compute the value K based on the next acceptable start time, which is based on the time transpired, the time of hop base state $S_0$, the hop resolution Tr, and the time required for timing reacquisition and radio settling. In any common system this value will be computed and stored as a binary number. Thus, the hop time is K*Tr, where K can be broken down into its individual bits (this example assumes an 8 bit value):

$$K=2^7k_7+2^6k_6+\ldots+2^1k_1+k_0$$

then the PN sequence generator at that desired time using the $G_n$ values stored:

$$S_1\!=\!S_0\cdot\Pi_{n=0\ldots7}(G_n)^{k_n}$$

This requires a series of polynomial multiplications, each performed as shown in FIG. 4. The example above uses a the 8 bit hop field K, which requires 9 polynomial multiplications. Thus, this typically requires more computation time than the fixed slot period hop, which requires only one multiplication.

E. Further Implementation Details

Figure 5:
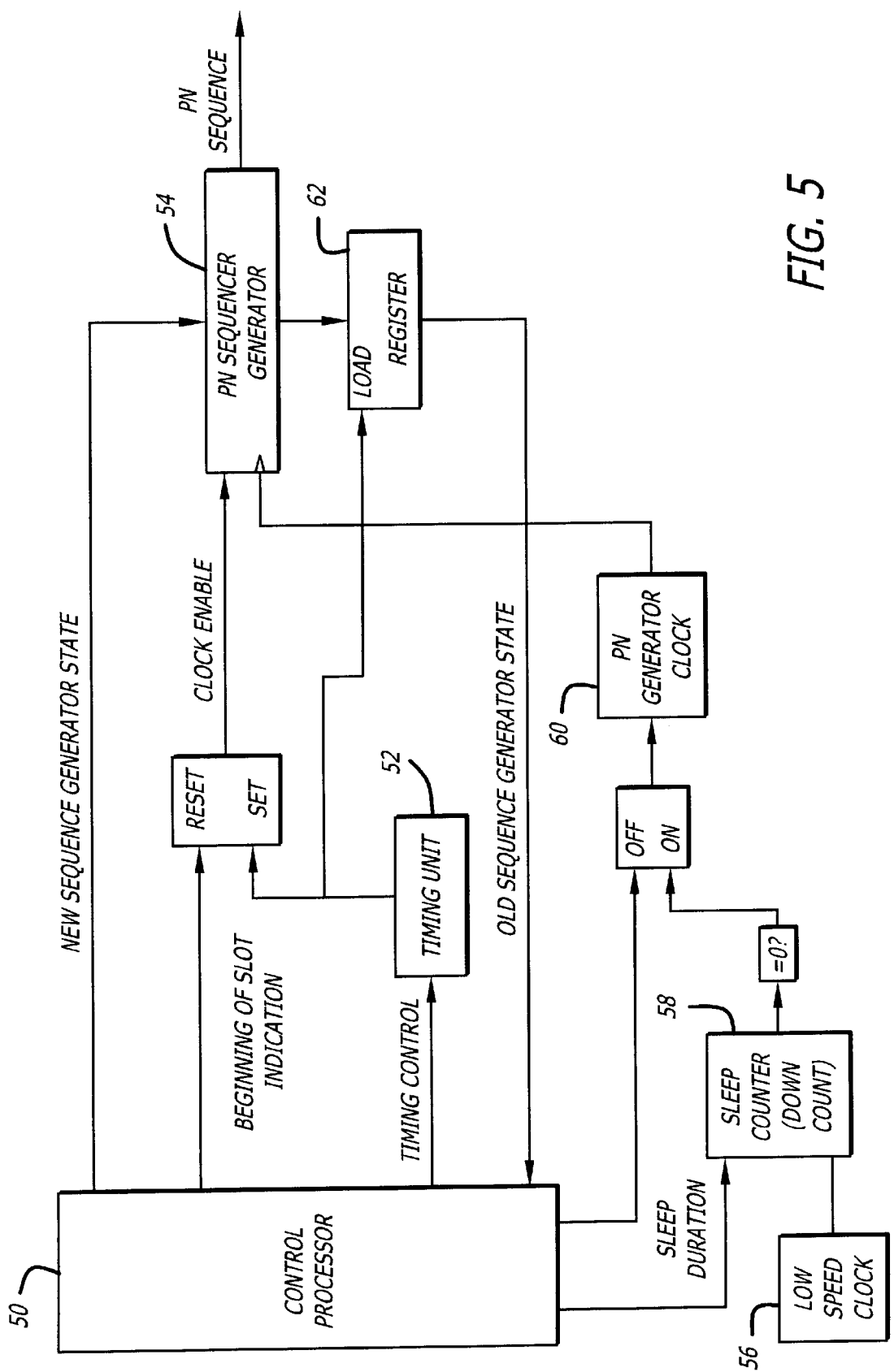
FIG. 5 is a block diagram of a preferred embodiment of the present invention.

A simple block diagram of a preferred embodiment of a PN sequence hopping system according to the present invention is shown in FIG. 5. The present invention uses the state of a PN sequence generator 54 prior to a sleep period to calculate a new state at a desired time after the end of the sleep period. In this way a high speed clock 60 which runs the PN sequence generator 54 can be turned off. A low speed clock 56, typically a 32 kHz oscillator, is maintained and controls a counter 58 to let the system know when to turn back on.

Prior to a first hop, at the beginning of a slot, the PN sequence generator is at a base state which is written to a register 62 and read by a Control Processor (CP) 50 for use in calculating the new state. For all subsequent hops, the base state is equal to the new state calculated in the previous hop, and thus the CP 50 does not need to read the register 62 for subsequent hops. The PN sequence hop computation is performed in the CP 50, which loads the new state into the PN sequence generator 54. The exact time at which the PN sequence generator 54 is restarted (enabled) is controlled by a hardware timing unit 52 which is itself controlled by the CP 50. The PN sequence generator 54 restart time will generally be hardware controlled in this manner because it must be correct to within one generator clock cycle, and a CP 50 cannot generally control hardware parts to this resolution with ease. Similarly, while the PN sequence generation could be done within the CP 50, this is typically not done because of the speed required and the simplicity of the generator circuit. At the start of a slot the PN sequence generator 54 writes its state into the register 62 such that it may be used for the next hop. Note that in steady state this is not necessary, as the value has just been written and is already known. However, this function is needed to give the sequence state necessary for the very first hop performed. When the PN sequence generator 54 is enabled at the start of the slot, the PN sequence is properly aligned and the MS can successfully receive the required slot.

Since the present invention allows the high speed clock 60 to be turned off during sleep mode while the lower speed clock 56 keeps track of the sleep time, there is a power savings obtained by using PN sequence hopping. This is because lower speed clock and counters using this clock will consume less power than a higher speed clock. The present invention is particularly advantageous for long and rapid PN sequences because long sequences are harder to initialize from scratch at some arbitrary timing, and rapid sequences require a faster, higher power clock.

In the context of cellular systems, the present invention can significantly increase the standby time of a cellular phone. This means longer battery life and a longer time between battery recharges by a user. Standby time is a key parameter in evaluating the relative worth of competing cellular phones on the market.

There are numerous ways to subtly change the implementation. At the highest level, different partitioning between CP and hardware is possible. More fundamental possible changes are:

1. GF polynomial multiplication can be done in different ways. For example, while the described embodiment uses a serial GF polynomial multiplier, a parallel multiplier is possible.

2. Rather than using GF polynomial multiplication, it is possible to use matrix multiplication. In this approach rather than raising the single state transition polynomial multiplier $x$ to some power and using the result for polynomial multiplication of the base state polynomial, one can raise the single state transition matrix to some power and use the result for matrix multiplication of the base state vector. This multiplication would be done with mod-2 arithmetic. While this is a possible alternative realization, it involves greater complexity and greater memory utilization.

3. One could change the time from which the base state is used. In a preferred embodiment the base state used in this multiplication is the beginning of the slot prior to the hop. This is arbitrary, and a system polynomial must always be available.

4. There are two complementary circuits that generate the same PN sequence: the insertion and prime architectures. This embodiment assumed the insertion architecture. A realization could be made with a complementary prime architecture.

The present invention may be used for resynchronization in any system that may require that the PN sequence bearing signal is not monitored for some time and must subsequently be recovered. As described previously, this may be used for "sleep" modes and introduces power savings. However, this invention may also be applied to non-sleep modes; here the gain is not in power savings but possibly in ease of implementation. If the mobile station stops monitoring the base station transmission for any reason, a timing error will accumulate. Ceasing to monitor transmission may be due to sleep or required measurements of other base stations. A shorter "pilot" PN sequence can be used to recover timing information. If there has been significant timing error accumulation in the mobile, then the longer PN sequence must now be readjusted to the correct timing. This can be done by slewing the timing (adjusting it incrementally one step at a time), or possibly by some hopping technique. Arbitrary hops with a resolution of 1 state transition (or generator "clock cycle") can be used to move the generator timing backwards or forwards. However, this is likely to be impractical as the hop would have to include any clock cycles skipped during the hop calculation period itself, a complex interaction between high speed hardware and software. However, a similar procedure to that of FIG. 3 can be used, but where off time is not sleep time but rather something else like other frequency search time. Again, this does not provide current savings but a possibly easier way to reacquire timing after a period with no time tracking.

II. Truncated Maximal Length Sequences

The foregoing embodiment of the present invention concerned maximal length code sequences. As used herein, a maximal length code sequence is a PN code sequence generated using a LFSR, such as shown in FIGS. 1 and 2, where the PN code sequence is generated by allowing the generator to run freely once an initial state has been loaded into the generator. As noted above, the only exception to such free-running generation is the case where the PN code sequence temporarily is not needed, such as during sleep mode or when it is desired to use a different PN code sequence. Generally, after such time periods have elapsed, the PN code generator is then loaded and enabled with the appropriate new state, based on the hop calculations described above.

Rather than using a maximal length sequence as described above, it is possible to use a truncated maximal length sequence. As used herein, a truncated maximal length sequence is a sequence that is periodically forced to a predetermined start state. For example, consider the case of a PN code sequence generator, such as described above, that includes 15 registers. In this case, the maximum length of the sequence is $2^{15}-1$ bits. However, rather then allowing the sequence to extend to the full $2^{15}-1$ bits, it is possible to initiate the generator with a particular state, run the generator for some period of time which results in less than $2^{15}-1$ bits, then force the generator to the start state, and finally repeat this sequence at regular intervals. Because the PN code sequence generator is forced to the start state at regular intervals, the resulting PN code sequence will still be periodic. In addition, the length of the truncated maximal length sequence can be any desired value, i.e., and it is not restricted to a length of the form $2^N-1$.

Generation of a truncated maximal length sequence can be accomplished using the architecture shown in FIG. 5. However, in this case, rather than control processor 50 forcing a new sequence generator state only for hops, control processor 50 is also programmed to force the start state at each such periodic interval. Alternatively, a separate hardware device may be utilized which forces the PN sequence generator state to the start state after each fixed number of clock cycles. It is noted that expressions such as forcing the PN sequence generator to a particular state or loading a particular state into a PN code generator are intended to mean the same thing, that is, that the generator's registers are loaded with certain bit values, thereby overriding any other state which would have naturally occurred were the generator allowed to run freely.

A similar hopping technique to that described above for maximal length PN code sequences can also be applied to truncated maximal length PN code sequences. Assume that a maximal length (non-truncated) sequence is generated with a N-bit generator polynomial which has a sequence length of $2^N-1$ bits, and such sequence is truncated to a subset of L of those bits, where $L \leq 2^N-1$. In this case, the truncated maximal length sequence is periodic with a period of L bits.

If $s_0$ is the start state for the generator, then the generator initially is loaded with start state $s_0$. The generator is then clocked once for each output bit. On the L-th clock, the generator is forced to start state $s_0$, rather than being allowed to continue to its natural subsequent state. This process is then allowed to continue, each time cycling through the same L states.

As noted above, the state of a MLFSR can be expressed as $x^k$, which can be uniquely mapped to a Galois Field polynomial of order n for a n-bit MLFSR, defining which bits in the MLFSR are ones and which are zeros. A single clock to the generator provides a new state of $x^{k+1}$. To hop the generator M clocks forward, one may load the generator with $x^{k+M}$. Thus, the objective for maximal length code sequences is to read the state $x^k$, determine the appropriate M, calculate $x^{k+M}$, load this value into the generator, and then start the generator at the appropriate time, equivalent to M clocks after the time at which $x^k$ was read.

Some additional work is required for truncated sequences. For a truncated sequence, there is some start state, $s_0=x^s$. Consider that there have been j clocks on a truncated generator, then the state is $s(j)=x^s x^{(j\ mod\ L)}=x^s x^k$, where L is again the length of the truncated sequence and $k=j\ mod\ L$. The state of the generator after M clocks is $s(k+M)=x^s x^{(k+M)\ mod\ L}$, where the state before the hop is $s(k)$.

Typically, the value of k is known to the system as there is a counter running to keep track of when the initial state $s_0$ must be loaded into the generator. One option is to calculate $x^{(k+M)\ mod\ L}$ in a straightforward manner and then calculate $x^s x^{(k+M)\ mod\ L}$, since $x^s$ is already known. However, this requires being able to compute and/or store factors for k+M as large as L-1. If L is substantially larger than the maximum hop $M_{max}$, then this may not be desirable. Alternatively, a factor $G=x^M$ can be found as noted above in connection with the discussion of maximal length PN code sequence hopping, together with the storage of an additional factor $T_0$ which accounts for the truncation. In this case, $T_0=x^{-L}=x^{P-L}$, where P is the period of the corresponding maximal length code sequence, typically $2^{15}-1$. Then:

$$s(k+M) = s(k)*G \quad \text{if } k+M < L$$

$$s(k)*G*T_0 \quad \text{if } k+M \geq L$$

The above assumes that M<L, such that $K+M \geq 2L$ is not possible. If this is not the case, then the state can be computed directly, as noted above, as:

$$s(k+M)=s_0*x^{(k+M)\ mod\ L}.$$

The above factors can be applied using the GF multiplier described above, and shown in FIG. 4. Alternatively, similar factors in the form of state transition matrices can be identified and applied using matrix algebra, also as described above in connection with maximal length code sequences.

As can be readily appreciated, this technique is similar to that described above for maximal length PN code sequences, with the performance of a modulo function or the addition of an additional factor to account for the truncation. Accordingly, the other considerations discussed above generally will apply here as well.

III. Gold Code Sequences

Figure 6:
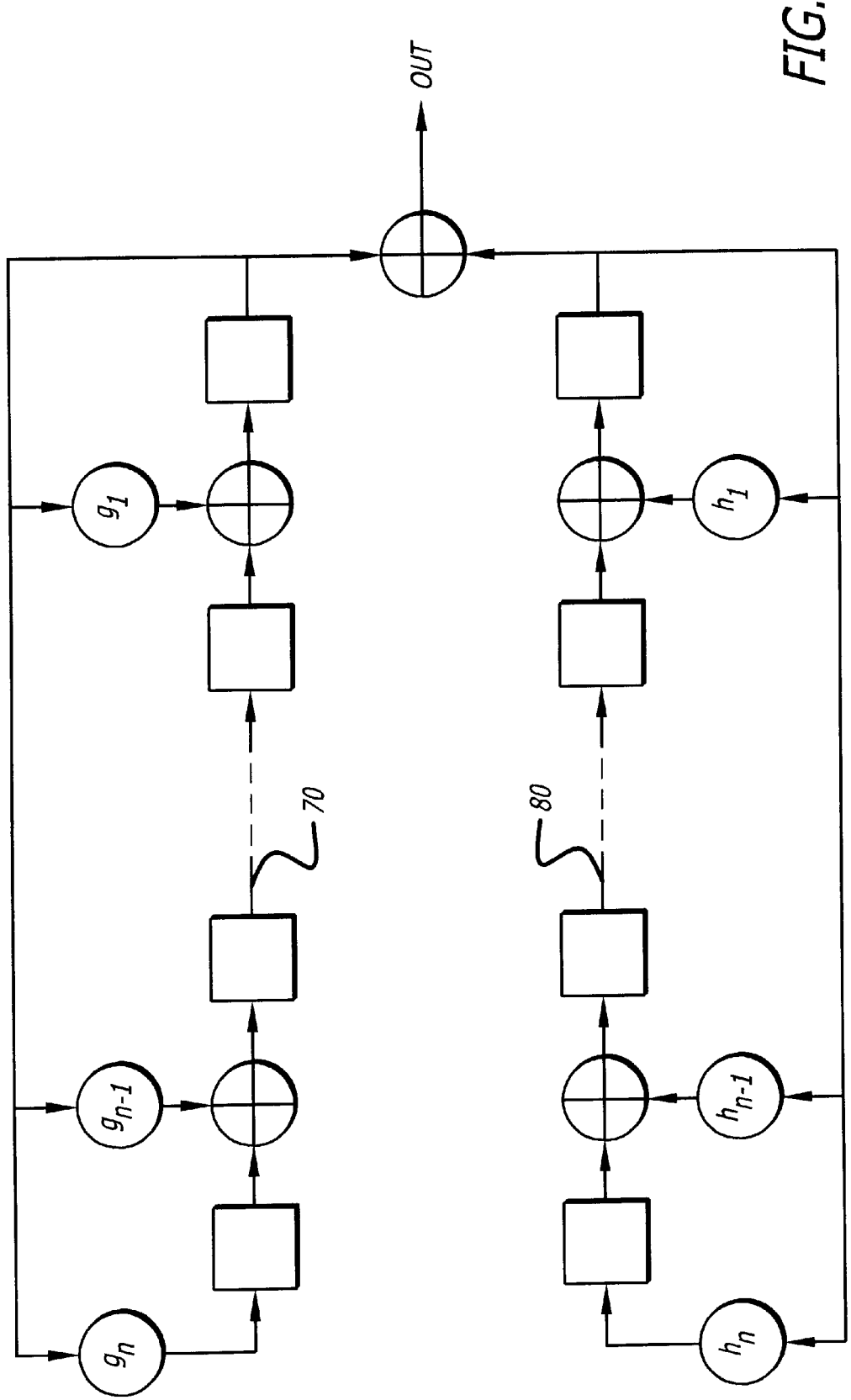
FIG. 6 is a block diagram of a Gold code generator.

Gold codes are obtained by exclusive-ORing the outputs of two maximal length PN code sequences of the same length. The maximal length PN code sequences are generated by MLFSRs as described above. Thus, the generation of a Gold code is illustrated in FIG. 6. The two maximal length PN code sequences shown in FIG. 6 are defined by the polynomials g(x) and h(x), each being maximal and of the same order, N. Thus, each MLFSR generates a sequence which is $2^N-1$ bits long. Using the configuration shown in FIG. 6, a set of $2^N+1$ different Gold code sequences can be generated by varying the relative sequence phases between the two generators through the $2^N-1$ possibilities and also including the sequences generated when the G-generator 70 state is all zeros or when the H-generator 80 state is all zeros.

The sequence hopping technique described above can also be applied to Gold codes. However, instead of performing a state transformation, (e.g., polynomial multiplication or matrix multiplication) to obtain the desired generator state for one MLFSR, two such state transformations must be performed in the present case, one for each constituent MLFSR (70 and 80) of the Gold code sequence generator.

While the number of states to advance each MLFSR of the Gold Code Sequence Generator is the same, because the generator polynomials for the two MLFSRs are different, two distinct polynomial multipliers and polynomial lookup tables (or two distinct matrices and matrix lookup tables) typically are required. However, it should be noted that it is relatively simple to create a binary programmable polynomial multiplier that can be programmed with the appropriate polynomial coefficients, either in hardware or software and, thus, it is also possible to construct a single multiplier and then to use that multiplier for both required multiplications. On the other hand, both multiplications can be performed simultaneously by utilizing distinct polynomial multipliers.

Thus, the same techniques applied above can be used to hop a Gold code sequence. Specifically, the number of states to advance the output PN code sequence is determined, and each constituent PN code sequence generator (e.g., 70 and 80) is hopped that number of states, for example, using the techniques described above for maximal length or truncated maximal length PN code sequences, whichever the case may be. Because this technique is an extension of those described above, the other considerations discussed above generally will apply here as well.

IV. Conclusion

In the above embodiments, a transformation function is used to advance the state of PN code sequence. In the preferred embodiments, this transformation function is implemented by performing either a GF multiplication or a matrix multiplication. However, other transformation functions may be used instead. Similarly, although maximal length, truncated maximal length and Gold code PN code sequences are discussed above, the principles discussed above can be applied to other PN code sequences as well.

By advancing the state of a PN code sequence generator in the foregoing manner, the PN code generator can either be temporarily shut down (often resulting in power savings) or else used for other purposes when the main PN code sequence is not required. Typically, the state of a PN code sequence generator can be advanced much more quickly than allowing the generator to reach that state on its own, thereby achieving the foregoing advantages. In fact, in many cases the amount of time required to advance the state of the PN code generator will be independent of the amount of time corresponding to the hop. This is because generally the same amount of processing is required to transform the state, regardless of the number of state transitions, with only the specific parameters varying based on such number of state transitions. For example, it is possible to hop states for a PN code sequence generated using a MFSLR and by performing a single GF multiplication or a single matrix multiplication, although the specific polynomial or matrix will vary based on the number of state transitions. For practice purposes, however, it generally will not be advisable to store factors corresponding to each possible hop. Accordingly, transformation functions for non-standard delays may have to be synthesized form multiple pre-stored functions, thus requiring additional processing time.

Each of the embodiments described above includes certain features. However, it should be understood that those features are not limited to the particular embodiment in which they are discussed, but instead can be utilized in the other embodiments as well in various combinations, as will be understood by those skilled in the art. For instance, in the case of combinations of pseudo-random noise sequences, such as the embodiment described above for Gold code sequences, each constituent PN code sequence generator can be hopped using either the technique for maximal length PN sequences or the technique for truncated maximal length PN code sequences, as the case may be.

Although the present invention has been described in detail with regard to the exemplary embodiments and drawings thereof, it should be apparent to those skilled in the art that various adaptations and modifications of the present invention may be accomplished without departing from the spirit and the scope of the invention. Accordingly, the invention is not limited to the precise embodiment shown in the drawings and described in detail hereinabove. Therefore, it is intended that all such variations not departing from the spirit of the invention be considered as within the scope thereof as limited solely by the claims appended hereto.

In the following claims, those elements which do not include the words "means for" are intended not to be interpreted under 35 U.S.C. §112 ¶6.

What is claimed is:

1. A method of pseudo-random noise (PN) code sequence hopping, said method comprising the steps of:
   generating an output PN code sequence by generating and combining plural intermediate PN code sequences, each of the plural intermediate PN code sequences being generated by a corresponding PN code sequence generator;
   storing a base state for each of the plural intermediate PN code sequences;
   identifying a number of states to advance the output PN code sequence, the number being greater than one;
   obtaining a transformation function for each of the plural intermediate PN code sequences, based on the number of states to advance the output PN code sequence;
   advancing the base state for each intermediate PN code sequence by the number of states to advance the output PN code sequence, by utilizing the transformation function for said each intermediate PN code sequence, to obtain a new state for said each intermediate PN code sequence;
   loading the new state for each intermediate PN code sequence into the corresponding PN code sequence generator; and
   enabling the PN code sequence generators with the new states.

2. A method according to claim 1, wherein the number of states to advance the output PN code sequence corresponds to a period of time during which the output PN code sequence is not required.

3. A method according to claim 2, further comprising a step of disabling the PN code sequence generators during a substantial portion of the period of time during which the output PN code sequence is not required.

4. A method according to claim 2, wherein the output PN code sequence is a Gold code.

5. A method according to claim 1, wherein there are exactly two intermediate PN code sequences that are combined by performing an exclusive-or operation.

6. A method according to claim 5, wherein the intermediate PN code sequences are truncated maximal length code sequences.

7. A method according to claim 1, wherein each of the PN code sequence generators comprises a linear feedback shift register.

8. A method according to claim 1, further comprising a step of truncating the plural intermediate PN code sequences by periodically forcing each of the corresponding PN code sequence generators to a start state that is fixed for each of the corresponding PN code sequence generators.

9. A method according to claim 1, wherein the transformation function for each of the plural intermediate PN code sequences is a Galois Field polynomial.

10. A method according to claim 9, wherein the step of advancing the base state for each of the plural intermediate PN code sequences is performed using a serial Galois Field multiplier.

11. A method according to claim 1, wherein the transformation function for each of the plural intermediate PN code sequences is a matrix.

12. A method according to claim 1, wherein the transformation function for each of the plural intermediate PN code sequences is pre-stored as a standard delay.

13. A method according to claim 1, wherein the transformation function for each of the plural intermediate PN code sequences is calculated from plural pre-stored delay functions.

14. A method according to claim 1, wherein each of the plural intermediate PN code sequences is a truncated maximal length sequence.

15. A method according to claim 14, further comprising steps of disabling the PN code sequence generators shortly after a time point corresponding to the base state for each of the plural intermediate PN code sequences and re-enabling the PN code sequence generators at a time point corresponding to the new state for each of the plural intermediate PN code sequences.

16. A method according to claim 1, wherein the base state for each of the plural intermediate PN code sequences corresponds to a same first time point, and wherein the new state for each of the plural intermediate PN code sequences corresponds to a same second time point.

17. A method according to claim 1, wherein the transformation function for each of the plural intermediate PN code sequences is a factor and the base state for said each of the plural intermediate PN code sequences is multiplied by said factor to obtain the new state.

18. A method according to claim 1, wherein an amount of time required to perform said step of advancing the base state for each intermediate PN code sequence by the identified number of states does not change when the identified number of states is changed.

19. An apparatus for pseudo-random noise (PN) code sequence hopping, said apparatus comprising:

plural generating means, each for generating an intermediate PN code sequence;

combining means for combining the plural intermediate PN code sequences to provide an output PN code sequence;

storing means for storing a base state for each of the plural intermediate PN code sequences;

identifying means for identifying a number of states to advance the output PN code sequence, the number being greater than one;

obtaining means for obtaining a transformation function for each of the plural intermediate PN code sequences, based on the number of states to advance the output PN code sequence;

advancing means for advancing the base state for each intermediate PN code sequence by the number of states to advance the output PN code sequence, by utilizing the transformation function for said each intermediate PN code sequence, to obtain a new state for said each intermediate PN code sequence;

loading means for loading the new state for each intermediate PN code sequence into the corresponding generating means; and enabling means for enabling said generating means with the new states.

20. An apparatus according to claim 19, wherein the output PN code sequence is a Gold code.

21. An apparatus according to claim 20, further comprising means for disabling said generating means shortly after a time point corresponding to the base state for each of the plural intermediate PN code sequences and means for re-enabling said generating means shortly before a time point corresponding to the new state for each of the plural intermediate PN code sequences.

22. An apparatus according to claim 19, wherein the intermediate PN code sequences are truncated maximal length code sequences.

23. An apparatus according to claim 22, wherein the transformation function for each of the plural intermediate PN code sequences is a factor, wherein the factor comprises G if (k+M)<L, and wherein the factor comprises $G*T_0$ if (k+M)≧L, where G is a factor which would be used to advance M states in a corresponding non-truncated maximal length sequence, k is an index of the base state, M is the number of states to advance the PN code sequence, L is a length of the truncated maximal length sequence, and $T_0$ is a factor to back up the corresponding non-truncated maximal length sequence L states.

24. An apparatus according to claim 19, wherein each of said generating means comprises a linear feedback shift register.

25. An apparatus according to claim 19, wherein the transformation function for each of the plural intermediate PN code sequences is a factor and the base state for said each of the plural intermediate PN code sequences is multiplied by said factor to obtain the new state.

* * * * *